Feb. 27, 1934.　　　R. D. EVANS　　　1,948,749
REGULATING SYSTEM
Filed May 11, 1933　　2 Sheets-Sheet 2

WITNESSES:
Fred C. Williams
C. F. Bryant

INVENTOR
Robert D. Evans
BY Franklin E. Hardy
ATTORNEY

Patented Feb. 27, 1934

1,948,749

UNITED STATES PATENT OFFICE 1,948,749

REGULATING SYSTEM

Robert D. Evans, Swissvale, Pa., assignor to Westinghouse Electric & Manufacturing Company, East Pittsburgh, Pa., a corporation of Pennsylvania Application May 11, 1933. Serial No. 670,483

18 Claims. (Cl. 172—237)

My invention relates to automatic regulators utilized with electrical power systems involving interconnected synchronous machines and has particular relation to means for causing such regulators to suppress angular oscillation when the system is being operated within the range of artificial stability.

In present day long-distance power-transmission systems, the majority of which involve alternating-current machines of the synchronous type connected through circuits of considerable reactance, the determination of the load which may be carried depends to a considerable extent upon the stability characteristics of the system. During recent years, the power to be transmitted by systems of the type under consideration has increased to such an extent that it is now economically important to consider means for increasing the maximum power practically transmittable and to insure continuity of service during transient disturbances such as load swings and short circuits.

In an alternating-current electrical system, power flows principally by reason of a phase difference between the rotors of the synchronous machines at the sending and receiving ends, or, what amounts substantially to the same thing, a phase difference in the internal or generated electromotive forces of the machines at the opposite ends of the line, one characteristic of such a system being that the power flow varies as a sine function of this angular displacement. It is thus a familiar fact that when a synchronous motor is supplied with power from a synchronous generator, either from a common bus or through an intervening reactance, there is a definite maximum power which can be transmitted at normal voltage under steady field conditions. Beyond this limit, generally referred to as the "steady-state" or static power limit, the machines break apart.

Thus, when the shaft load of a synchronous motor connected to an alternator directly or through a transmission line is gradually increased, a point is reached where no more electrical power can be supplied to the motor, the limit depending upon the total reactance between the generator and motor including their internal reactances and upon the values of excitations which exist. Small values of excitation give small values of breakdown power and large values give large values of breakdown power. The magnitudes of the excitation which can be applied to the machines are preferably limited by the condition that certain predetermined terminal voltages shall not be exceeded. For different sets of fixed excitation values, there will be corresponding values of terminal voltages and power when breakdown occurs.

It is also true, however, that considerably more power can be transmitted by the same machines, over the same circuits, provided that the field excitation of the machines, instead of being held steady, is properly varied in accordance with the demands from moment to moment. Under this condition, it has been shown that the machines are at each moment, either actually drifting further apart in phase with a consequent drop in voltage or nearer together in phase with a consequent rise in voltage. Although, in such a condition the system is inherently unstable, with proper control of the impressed excitation voltage, "artificial" stability can be maintained and the maximum power may thereby be increased.

Such stable operation beyond the steady-state limit is attainable, as is known, when the machine excitation is controlled by an automatic voltage regulator having proper characteristics. It is to the provision of means for obtaining improved or specially compensated characteristics in regulators adapted for this service that my invention is primarily directed.

As will be seen presently, the improved regulator of my invention, which is adapted to form a part of an automatic regulating scheme disposed to permit a transmission system to operate within the range of artificial stability, permits the power limits of the transmission system to be substantially increased over those which have been practically attainable through the utilization of conventional regulators known heretofore.

In U. S. Patent No. 1,692,495, issued November 20, 1928 to R. D. Evans, et al, and assigned to the Westinghouse Electric & Manufacturing Company, there is described one automatic scheme for improving system stability through automatic control of the excitation of the generators. This scheme, known as "Quick response excitation" includes means for changing the excitation in a period of time which is so short that the system does not swing to a critical point beyond which recovery is doubtful.

As is pointed out in the patent above referred to, artificial stability essentially depends upon the use of transient reactance of the machines instead of the synchronous reactance for determining the stability limits. If no special stabilizing means are present, there is a tendency for the machines when slightly exceeding the maximum stable angle between internal voltages to increase the demagnetizing currents and thus reduce the air gap flux which cumulatively tends to increase the angle between machines leading to pull out. As is further pointed out in that patent, with quick-acting voltage regulators available, any tendency for the machine to increase its angle tends to drop the internal voltage and bring the regulators into play for increasing the excitation. The effect of this increased excitation is to increase the internal voltage and to reduce the overall angle between machines.

Thus, without regulators, the maximum angle is determined by synchronous reactance whereas with quick acting voltage regulators the maximum angle is determined by a fictitious reactance intermediate synchronous reactance and transient reactance. Improvement in system power limits is thus effected with the automatic regulators by causing the system to operate within the range of artificial stability already referred to.

With commercial machines operating at loads slightly in excess of the stability limit with fixed excitation, the process of pulling out of step may be quite slow. In practice it is found that the period of time available for readjusting excitation or other equivalent control under the above-stated conditions is long enough for an operator to recognize the condition and to manually adjust rheostats to change the excitation in the required direction. Hence, it will be seen that there is ample time for an automatic stability improvement regulator to act, particularly in the most frequently encountered cases in which the system angle corresponding to transient reactance is somewhat below 90 electrical degrees.

In the case of quick-acting automatic voltage regulators applied to system synchronous machines for maintaining the same terminal voltages, laboratory tests have conclusively demonstrated that the slowly increased or steady load limit of a given transmission circuit may be raised from 100% with fixed excitation to 125% or 150% with automatic voltage control. Similar tests show that if the reactance of the machine interconnecting circuit is made to substantially approach zero, the pull out power limit under steady state conditions may be increased from 100% to 300% or 400%. The percentage values stated are based upon a 100% power limit for the system determined for particular terminal voltages of the connected generator and motor by the synchronous reactances of the machines and any additional reactance of the interconnecting circuits. These results are more fully discussed by C. F. Wagner and R. D. Evans in a paper dealing with artificial stability which appears in the February 1926 issue of the A. I. E. E. Transactions, and in certain supplemental remarks by the same individuals recorded on page 93 of the same volume.

When machines are operating above the static power limit they are continually in the incipient stage of breakdown, as before pointed out. As they begin to break from synchronism, the terminal voltage changes are small, but if the small changes of terminal voltage are not corrected, the machines soon obtain sufficient velocity of oscillation to make it extremely difficult to restore them to equilibrium at a later instant regardless of the speed of build up of the excitation voltage. Consequently, any delay of the regulator response to these voltage changes at this time has a vital effect upon the performance of the system. As will be more completely pointed out, the improved regulator of my invention is capable of avoiding such delays in a manner that the angular change may be effectively anticipated.

A major requirement for artificial stability is that the voltage regulator shall not accumulate such oscillations as may occur. It is known that transmission systems comprising synchronous machines are ordinarily oscillatory, that is when shaft loads are suddenly changed, the system does not arrive at its final position of equilibrium at once but only after an oscillation. Once such an oscillation begins, it may be either accumulated or damped out depending upon the time phase characteristics of the regulator and excitation system. In the regulator of my invention, as will be more completely explained, these time phase relations are such that the oscillations will tend to be effectively damped out.

A careful analysis has shown that upon the occurrence of a system oscillation regulators possessing the usual quick-response characteristics are incapable of effecting excitation corrections which are in phase with or which instantaneously follow the changes in system angle which necessitated them. In other words, there is, due to the sluggishness with which changes in machine flux proceed, a time lag between system angle variations set up by an oscillation and the usual regulator adjustment of machine excitation. Because of this time lag, the excitation corrections are less effective in damping out the oscillations and in maintaining system stability than would be the case were the regulator action to proceed simultaneous with the angular changes or in anticipation thereof. This delayed response of course restricts the artificial stability power limits of the system. My invention is specifically directed to means for overcoming the above pointed out deficiencies in automatic voltage regulators and for attaining other advantageous results to be particularized hereinafter.

Generally stated, it is an object of my invention to increase the power limits of electrical circuits connecting alternating-current systems involving synchronous machines.

One object of my invention is to provide automatic means for improving the stability of power systems during oscillations and other conditions which tend to cause the generator and motor ends of the transmission circuit to fall out of synchronism.

Another object of my invention is to provide, for an automatic regulator utilized to permit a transmission system to operate within the zone of artificial stability, oscillation suppressing means which permit the maximum power limits of the system to be raised.

A further object of my invention is to decrease the tendency of synchronous-machine systems to hunt or cumulatively build up angular oscillations, particularly when heavily loaded.

An additional object of my invention is to provide, for an automatic regulator utilized with a power transmission system, compensating means so responsive to angular oscillations of the power system that the regulator will be caused to damp out the oscillations instead of allowing them to cumulatively build up.

Another object of my invention is to provide means whereby an automatic voltage regulator utilized with a power transmission system will effect corrective machine excitation adjustments which are substantially coincident with the changes in system angle which necessitate them.

In practicing my invention, I modify automatic voltage regulators of known types in such manner that changes in the angular displacement of system voltage are caused to directly influence the regulator to thereby compensate the excitation adjustment of the controlled machine in time phase relation with the angular variations. I have discovered that through the utilization of such compensating means, system oscillations may be effectively damped out so that the maximum power limit of the system is effectively raised.

My invention, together with additional advantages and objects thereof, will best be understood from the following description of specific embodiments when taken in conjunction with the accompanying drawings, in which Figure 1 is a single line diagrammatic representation of a power system to which the improved regulator of my invention is adapted.

Figure 1:
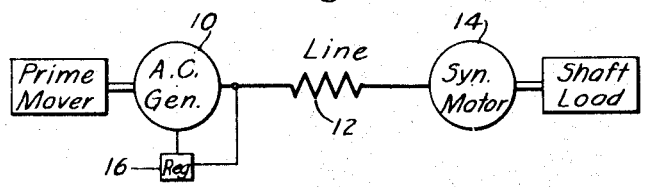

Referring to the drawings and particularly to Fig. 1 thereof, the power system there illustrated comprises a prime-mover driven alternating-current generator 10 which is connected through a line or transmission circuit 12 to a synchronous motor 14 which drives a shaft load. To control the excitation of generator 10 in a manner that the system may be operated within the range of artificial stability, an automatic regulator designated at 16 is illustrated.

Figure 2:
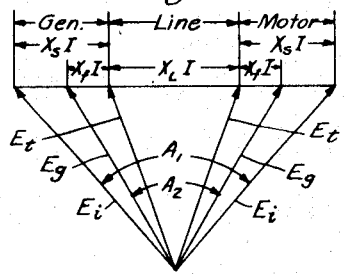
Fig. 2 is a diagram of voltage vectors illustrating certain characteristics of the system of Fig. 1.

The vector diagram of Fig. 2 illustrates the voltage and phase angle relations for the system of Fig. 1 when the generator 10 supplies at a terminal voltage $E_t$ a current I to the motor 14. It is assumed that the line 12 possesses a reactance $X_L$ and that each of the machines has a synchronous reactance $X_s$. When the excitation of the two machines is maintained constant, as is the case when no automatic voltage regulators are used, the maximum system angle $A_1$ is determined by the synchronous reactance and, as indicated, is measured between the two internal induced voltage vectors $E_i$ of the generator and motor. However, with quick-acting voltage regulators, typified by device 16 in Fig. 1, the maximum angle $A_2$ is determined by a fictitious reactance $X_f$ intermediate synchronous reactance and transient reactance. It will be observed that angle $A_2$, which is the one effective when the power system is being properly operated within the range of artificial stability, is measured between the internal air gap voltage vectors $E_g$ of the machines and is considerably smaller than the constant excitation characteristic angle $A_1$. Because of this decrease in effective system angle, obtained on commercial systems through the utilization of voltage regulators which cause the machines to tend to operate on a constant voltage rather than a constant excitation characteristic, the power limits of the system are materially raised, as has been pointed out.

Figure 3:
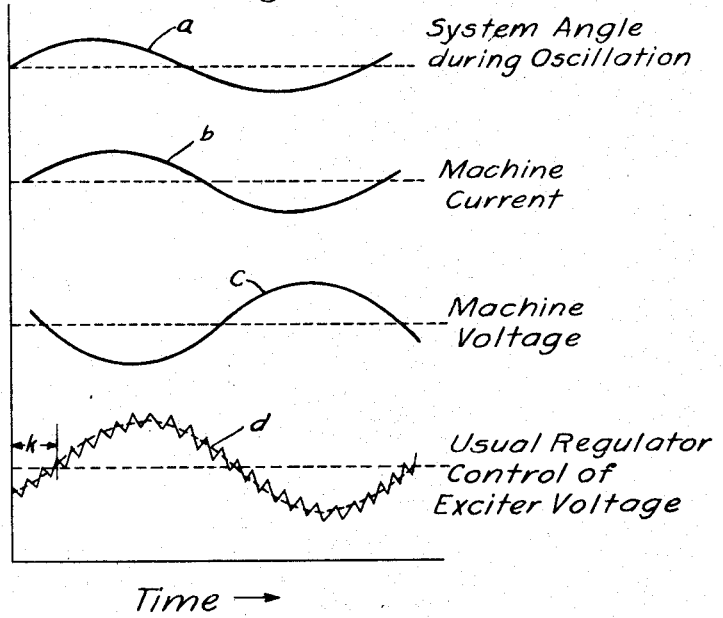
Fig. 3 is a group of waves indicating the relationship between certain characteristics of one of the synchronous machines of the system of Fig. 1 during the necessary oscillatory motion which obtains for system operation within the zone of artificial stability.

It has also been pointed out that for a condition of artificial stability, the interconnected synchronous machines are at each moment either actually drifting further apart in phase with a consequent drop in voltage or nearer together in phase with a consequent rise in voltage. This relation is graphically depicted in Fig. 3 in which wave $a$ illustrates the angular displacement of a power system, of the type shown in Fig. 1, during an oscillation, wave $b$ the resulting variation in machine current, and wave $c$ the attending fluctuation in machine voltage. Changes in machine flux requiring as they do an appreciable amount of time, the curve of machine voltage $c$ substantially lags behind the system angle curve $a$, as shown, machine voltage being an integration of machine flux and current. Because of this slowness of flux change the current curve $b$ also lags the angle curve $a$ though to a lesser degree than does curve $c$. It will be understood that, particularly at times of system disturbances, the oscillations may not be periodic as roughly indicated in Fig. 3 and further that the magnitude of variations would normally be less than shown.

It can be shown that the ideal excitation system for artificial stability operation is one which will supply a voltage to the machine field winding which is in time phase with and proportional to changes in the power system phase angle during oscillation. Unfortunately, however, the usual regulator control of exciter voltage which has been utilized in the past does not provide this desired time phase relation but instead effects an exciter voltage adjustment which, for the reasons above stated and because of delays in regulator response, substantially lags the variation in the power system phase angle in the manner indicated by curve $d$ of Fig. 3. In practice, the magnitude of this lag may be of some value such as is indicated by $k$ in Fig. 3.

Figure 4:
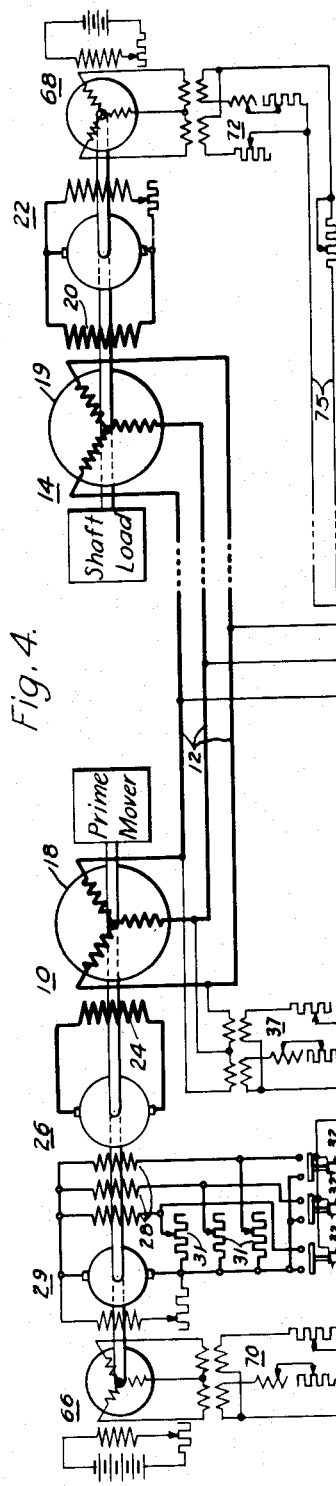
Fig. 4 is a diagrammatic view of apparatus and circuits illustrating one preferred form of phase-angle responsive compensating means applied to a vibrating type regulator which controls the excitation of a synchronous generator forming a part of the power transmission system of Fig. 1.

To overcome the objection just described, I contemplate the provision with automatic voltage regulators of the conventional vibrating type of the before-mentioned system-phase-angle-actuated compensating element, one preferred form of which is depicted in Fig. 4. The power transmission system of Fig. 4 is a more detailed reproduction of the fundamental system shown in Fig. 1, it comprising an alternating current generator 10 illustrated as having three-phase armature windings 18 interconnected through transmission circuit conductors 12 with the armature windings 19 of a synchronous motor 14. Machine 14 is provided with a field winding 20 which is energized by an exciter 22.

The field winding 24 of machine 10 is similarly energized by means of an exciter 26 shown as being provided with a multi-section field winding 28 which, in turn, derives its energization from a pilot exciter 29. In the energizing circuits of field winding sections 28 are disposed resistors 31 which are arranged to be short circuited upon the actuation of shunting relays 32.

The excitation of machine 10 is controlled by means of an automatic voltage regulator 16 which is illustrated as being of a well known vibrating type. As shown, it comprises a main control winding 35 energized by the machine voltage through a positive-phase sequence network 37, and a vibrating element winding 38 similarly energized through a network connection 39. Networks 37 and 39 are each for the purpose of supplying to the regulator windings a single phase voltage which at all times is proportional to the positive phase sequence component of the three single phase voltages acting in the 3-phase circuit 12. Such networks which are well known in the art, are more completely shown and described in U. S. Patent No. 1,571,224, granted February 2, 1926 to C. T. Allcutt, and assigned to the Westinghouse Electric & Manufacturing Company.

The main control winding 35 of the regulator is disposed to exert an upwardly acting pull upon a plunger member 36 which is linked to one end of a bar member 42 pivotally suspended at its center from the lower end of a bell crank lever 43 and carrying at its opposite end a counter balancing weight 44. Suspended from the horizontal portion of bell crank 43, by means of a spring 46, is a plunger 73 upon which the vibrating element winding 38 exerts an upwardly acting force. Carried by the bar member 42 is a contact member 48 which is disposed to engage a stationary contact member 50 in order to complete an energizing circuit for a master relay 52, a battery 53 being shown as the source of energization for this circuit. Relay 52, in turn, controls the actuation of resistor shunting relays 32 before mentioned and also that of a vibrating relay 54 which is disposed upon actuation to short circuit a resistor 56 and thereby lower the impedance of the energizing circuit for vibrating element winding 38 of the regulator 16.

Regulator 16, just described, possesses the characteristic, common to all vibrating-contact voltage regulators, that the amount of excitation supplied to machine 10 is controlled by periodically short circuiting resistors 31 in the excitation circuit. When the contacts 48—50 of the regulator are closed all the time, maximum voltage is obtained at the terminals of exciter 26 and when opened all the time minimum voltage is obtained. By varying the ratio of the time that the regulator contacts are closed to the time that they are open, any value of average excitation voltage between these limits can be obtained.

In operation of the regulator 16, engagement of the two contact members 48 and 50 effects the actuation of master relay 52 which, in turn, causes vibrating relay 54 to short circuit resistor 56 thereby raising the voltage impressed upon vibrating control winding 38. The resulting increase in the upward pull exerted upon the plunger member 73 suspended from bell crank 43, allows tension spring 58 to rotate the bell crank in a counter-clockwise direction thereby moving contact member 48 to the right and out of engagement with member 50. This interruption of the actuating circuit for relay 52 effects the opening of both relays 52 and 54 thereby lowering the voltage impressed upon control winding 38 to its original value. The decrease in upward pull on the associated plunger member rotates bell crank member 43 in a clockwise direction thereby moving contact member 48 to the left to re-establish its engagement with member 50.

As a consequence, the contact members are again caused to separate in the manner just described and a continuous vibration thereof is caused to be effected, the frequency being of the order of several times per second. The elevational position of the horizontally oscillating contact member 48 is determined by the magnitude of the voltage of machine 10 which, as pointed out, acts upon main control winding 35 of the regulator. An increase in voltage moves the contact member to a higher position and a decrease in voltage allows it to be lowered into closer proximity with the stationary contact member 50. Such a change in elevational position thus acts to vary the ratio of the time that the contacts are closed to the time that they are open, a lowering of the generator voltage increasing the value of this ratio and a raising thereof decreasing the time-closed to time-opened ratio value. To stabilize the movements of the main control and vibrating plunger members of the regulator, suitable dash pots 60 and 61 are associated therewith in the manner shown.

Master relay 52 following, in the manner explained, the opening and closing actions of the regulator contact members, in addition to transmitting them to vibrating relay 54, also controls the actuation of resistor shunting relays 32 in the excitation circuit by periodically establishing and interrupting the actuating circuits of these shunting relays. Consequently, when the voltage of regulated machine 10 drops, relays 32 are caused, in their vibrating action, to increase the ratio of the time that the resistors 31 are short circuited to the time that they are active in the exciter circuit, with the result that the voltage of exciter 26 is raised and the excitation of machine 10 appropriately increased. In a similar manner, a rise in the voltage of regulated machine 10 acts to lower the ratio of the time that resistors 31 are short circuited to the time that they are active in the excitation circuit, with the result that the exciter voltage is appropriately lowered.

Preferably, the relays utilized by the regulating system are of the quick acting type in order that the vibrations of the regulator contacts may be transmitted to the excitation circuit without time delay. For a similar reason, the excitation circuit itself is preferably one having a low time constant, the expedient illustrated to attain this end being the sectionalization of the main excitation field windings 28. In spite of these precautions however, there is still an appreciable time lag in conventional regulators to the response thereof to changes in system angle, as has been explained in connection with curves $a$ and $d$ of Fig. 3. To overcome or compensate for this delay, I contemplate, in the embodiment of my invention illustrated in Fig. 4, the provision of an auxiliary element 64 for regulator 16, which element is energized by a potential directly proportional to the magnitude of the power system angle. This potential may be derived in any suitable manner, the equipment shown in Fig. 4 for supplying it comprising a pilot generator 66 arranged to be driven by the rotor of the main alternating current generator 10, and a second pilot generator 68 similarly associated with synchronous motor 14. These pilot generators are preferably of a similar number of phases as the main machines, so that they may supply alternating current voltage comparable to the internal induced voltages in the main machines. They may, however, be simple phase generators in which case a direct connection with the auxiliary winding 64 of the regulator may be made.

To convert the 3-phase voltages produced by the pilot generators into single phase potentials which are more readily suitable for energizing the auxiliary regulator winding 64, positive phase voltage sequence networks 70 and 72 may be utilized in the manner shown. The output terminals of the two networks are interconnected through auxiliary winding 64 in such manner that this winding will be energized by a potential determined by the angle of phase displacement between the two pilot generator voltages. Hence, by appropriately setting the pilot generator rotors with respect to those of the main machines with which they are associated, the auxiliary regulator winding 64 may be influenced by a potential which varies in direct accordance with changes in the power system angular displacement. As will become more apparent these settings may be such that at some particular value of system load the current through the auxiliary winding 64 of the regulator will be zero.

In operation of the complete regulating system illustrated in Fig. 4, an increase in the power system angle to a predetermined or dangerous value increases the energization of auxiliary regulator winding 64 and by raising the magnitude of downward pull exerted upon plunger member 73, suspended from bell crank 43, raises the clockwise rotative torque applied to the bell crank to the extent that contact member 48 will be held in permanent engagement with contact member 50 so that the excitation of machine 10 will be raised at the maximum rate of which the excitation system is capable. The regulator contacts will be maintained in this closed position without vibration until an exciter voltage, required to raise the excitation of machine 10 to the point that the power system angle will be lowered below the predetermined or dangerous value, is produced. When such lowering takes place, the influence of auxiliary winding 64 will be reduced so that normal vibration of regulator contacts may again be resumed.

It will thus be apparent that the compensating element depicted in Fig. 4 is of material assistance in preventing the power system angle from exceeding a safe value, inasmuch as it causes the regulator to increase the machine excitation at the maximum possible rate when a predetermined angular value is attained by the system, and to allow this maximum rate to be discontinued only when the system angle has appropriately been reduced. Since the auxiliary element is directly responsive to changes in the system angle, the rapidity of its response may be made extremely high so that much of the objectionable time lag which would otherwise be present may be effectively eliminated. Because of this rapidity of response, a regulator provided with the compensating means of my invention possesses superior system oscillation damping characteristics.

It has been pointed out that by properly setting the pilot generator rotors with respect to those of the main synchronous machines from which they are driven, at some particular value of power system angle the current through the auxiliary winding 64 of the regulator will be zero. For such a condition the normal response of the regulator 16 will in no way be interfered with.

As the power system angle increases a voltage will be impressed upon winding 64 which has such a phase position, with respect to the main circuit voltage acting upon winding 38 of the regulator, that the upward pull of this winding on the common plunger member 73 will be opposed and the contact members 48 and 50 will be maintained in a more intimate relation, causing, as before explained, the regulator to increase the machine excitation at a rate in excess of normal.

Similarly, as the power system angle decreases a voltage of reversed polarity will be impressed upon winding 64 to cause this winding to assist winding 38 in its upward pull on the plunger member. The contact members 48 and 50 being thus maintained in a less intimate relation the excitation changes affected by the regulator proceed at a rate which is below normal.

In the system of Fig. 4, the dotted sections of transmission circuit conductors 12 and of pilot control conductors 75 indicate that a considerable distance may intervene, as in practice it actually does, between the two main synchronous machines comprised by the power system. In the event that it is desired to eliminate pilot control conductors 75, this may be done by the utilization of remote metering equipment now known in the art, which permits the wave of voltage produced by pilot generator 68, for example, to be transmitted along the main transmission circuit conductors 12 to the regulating apparatus 16 at the sending end of the line. Inasmuch, however, as this equipment forms no part of my invention, no showing or attempt at detailed description thereof is here made.

As the vector diagram of Fig. 2 indicates, a measure of the total power system angle is obtained from the phase displacement between the internal induced voltage $E_i$ and the terminal voltage $E_t$ of one of the main synchronous machines. Although this angular displacement is smaller than the total angle of the complete system, it is nevertheless an accurate index of this total angle and is of a sufficient magnitude to effectively influence a special regulator compensating element of the type described as comprising winding 64 in Fig. 4. To adapt this winding for the manner of energization just described, the energizing circuits thereof may be modified as indicated in Fig. 5.

Figure 5:
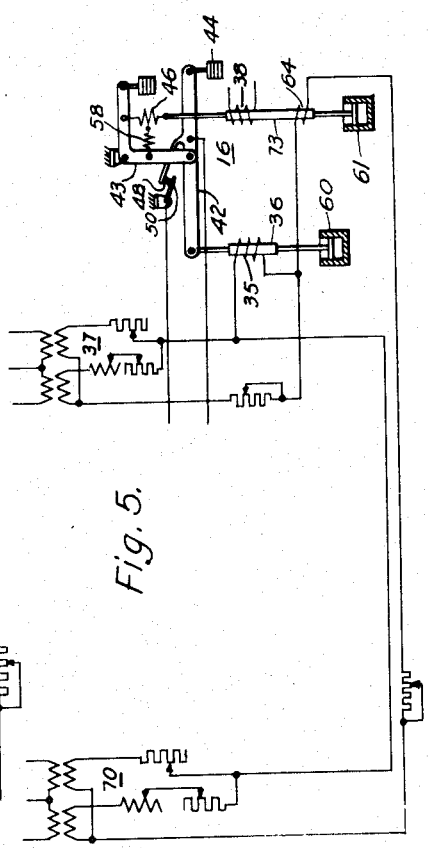
Fig. 5 is a diagrammatic view of the regulator shown in Fig. 4 illustrating a modified form of energization for the phase-angle responsive compensating element thereof.

In Fig. 5, the compensating winding 64 is acted upon by a potential determined by the angular displacement between the internal induced and terminal voltages of regulated machine 10 which difference may be derived by an opposition connection of the output circuits of positive phase sequence networks 70 and 37, respectively associated with pilot generator 66 (not shown in Fig. 5) and main generator 10 (also not shown in Fig. 5). It will be apparent that in operation, the phenomena involved will be essentially the same as already detailed in connection with the system of Fig. 4, the only difference being that the magnitude of the potential which influences the auxiliary regulator winding 64 will be somewhat reduced. This reduction, however, may be compensated for by properly proportioning the winding and its associated plunger member 73 to provide a more sensitive combination.

Figure 6:
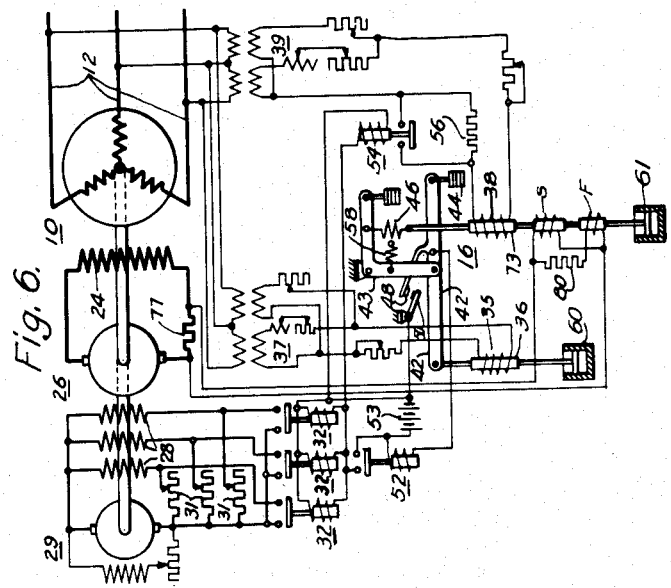
Fig. 6 is a diagrammatic view of apparatus and circuits illustrating phase-angle-change compensating means for the regulator of Figs. 4 and 5 which are energized from the field winding circuit of the regulated machine.

Another embodiment of my invention is illustrated in Fig. 6 as being applied to the conventional vibrating-type voltage regulator 16 already described as controlling the excitation of alternating-current generator 10. As is known, the field winding current of a synchronous machine follows a variation substantially similar to the changes in power system phase angle. The embodiment of my invention shown in Fig. 6 utilizes this characteristic. The equipment there illustrated comprises a resistor 77 disposed in the circuit of field winding 24 of machine 10 in a manner that there appears across it a voltage drop which varies directly with changes in the field winding current and hence is proportional to the power system angle. This voltage drop is utilized to energize two auxiliary regulator windings S and F which are associated with plunger elements mechanically connected to the vibrating control element plunger of the regulator 16. In the circuit of winding F is disposed a resistor 80 which gives to this circuit a much faster time constant than is possessed by the circuit of winding S. Because of this difference in time constant, rapid changes in the potential across resistor 77 will be effective only upon winding F, which is disposed in a manner similar to that of winding 64 in systems of Figs. 4 and 5. Rapid changes in power system angle therefore will beneficially compensate the regulator in the system of Fig. 6 in the same manner as does the winding 64 in the system of Figs. 4 and 5. However, more gradual changes which the regulator is inherently capable of taking care of affect both windings F and S with equal magnitude and winding S being differentially related to winding F, no recalibration or compensation of the regulator will thus be had for these gradual angular changes.

Although I have shown and described certain specific embodiments of my invention, I am fully aware that many further modifications thereof are possible. My invention, therefore, is not to be restricted except insofar as is necessitated by the prior art and by the scope of the appended claims.

I claim as my invention:

1. In combination with an alternating-current transmission system comprising a power circuit and a synchronous machine connected thereto, an automatic voltage regulator for controlling the excitation of said machine, and means, responsive to changes in the phase angle between the power voltages at separated points in said system, for directly influencing said regulator in accordance with the deviations of said angle from a given magnitude, said means acting to so modify the normal action of the regulator that changes in machine excitation which the regulator institutes are caused to proceed in substantial time phase coincidence with changes in said system phase angle.

2. In combination with a synchronous-synchronous transmission system comprising a power circuit, an alternating-current dynamo-electric machine connected thereto, and an automatic voltage regulator for controlling the excitation of the machine, means for increasing the stability and power limits of said system comprising an auxiliary control element for the regulator, and means for influencing said auxiliary element by a control force which varies in accordance with changes in the power-voltage phase angle of the transmission system, said auxiliary element acting to modify the normal voltage-change-responsive action of the regulator in a manner that changes in machine excitation which the regulator effects will proceed in substantial time-phase coincidence with the changes in system phase angle which occasion them.

3. In an alternating-current power system comprising a transmission circuit, a synchronous machine connected thereto and an automatic regulator for controlling the machine excitation in a manner to maintain constant the machine voltage, means for increasing the stability and power limits of said system comprising a compensating element disposed, when energized, to modify the normal action of said regulator, and means for energizing said element in accordance with deviations from a given value in the magnitude of the power-system phase angle.

4. In an alternating-current power system comprising a transmission circuit, a synchronous machine connected thereto and an automatic regulator for controlling the machine excitation in a manner to maintain constant the machine voltage, means for increasing the stability and power limits of said system comprising a compensating element disposed, when energized, to modify the normal action of said regulator, and means for energizing said element in accordance with deviations from a given value in the magnitude of the power-system phase angle, said means causing the regulator to increase the machine excitation at the maximum rate of which it is capable when the said system angle exceeds a given value.

5. In combination with a synchronous-synchronous transmission system comprising a power circuit, a synchronous machine connected thereto, and an automatic voltage regulator for controlling the excitation of the machine, means for causing the regulator to change the machine excitation at a rate which is higher than normal when the phase angle between the power voltages at separated points in said system exceeds a given value and at a rate which is lower than normal when the said system phase angle is below said given value.

6. In a synchronous-synchronous power-transmission system, the combination with an automatic voltage regulator disposed to control the excitation of a synchronous machine comprised by the system of a compensating element disposed, when energized, to modify the normal action of said regulator, and means for energizing said element in accordance with deviations from a given value in the magnitude of the power-system phase angle.

7. In a synchronous-synchronous power-transmission system, the combination, with an automatic voltage regulator disposed to control the excitation of a synchronous machine comprised by the system, of a compensating element disposed, when energized, to modify the normal action of said regulator, and means for energizing said element in accordance with deviations from a given value in the magnitude of the power-system phase angle, the resulting modification in regulator action being such that changes in machine-excitation which the regulator effects will proceed in substantial time phase coincidence with the changes in system phase angle which occasion them.

8. In a synchronous-synchronous power-transmission system, the combination with an automatic regulator disposed to control the excitation of an alternating-current dynamo-electric machine comprised by the system, of means for increasing the power limits of said system when operated within the range of artificial stability comprising an auxiliary control element for the regulator, and means for energizing said element in accordance with deviations from a given value in the magnitude of the power-system phase angle, said element acting to so modify the normal voltage-change-responsive action of the regulator that changes in machine excitation which the regulator effects will proceed in substantial time-phase coincidence with the changes in system phase angle which occasion them.

9. The combination with a power system comprising a synchronous dynamo-electric machine, an exciter therefor, and a regulator responsive to the voltage of the machine and operatively associated with said exciter, of an auxiliary control element for the regulator, and means for energizing said element in accordance with deviations from a given value in the phase angle between the power voltages acting at separated points in said system.

10. The combination with a transmission system comprising an alternating-current line section having a synchronous machine connected to each end thereof, a voltage regulator disposed to control the excitation of one of said synchronous machines, an auxiliary control element for the regulator, and means for supplying to said element, a voltage which varies in accordance with deviations of the transmission-system phase angle from a given value, said means comprising an alternating-current pilot generator driven by each of said two synchronous machines, and a circuit for impressing upon said auxiliary element the vector difference between the voltages of said two pilot generators.

11. The combination with a transmission system comprising an alternating-current power circuit having a synchronous machine connected to each end thereof, a regulator disposed to control the excitation of one of said synchronous machines, said regulator having a solenoid element influenced by the voltage of that machine, an auxiliary winding magnetically associated with said solenoid element, an alternating-current pilot generator driven by each of said two synchronous machines, and a circuit for impressing upon said auxiliary winding the vector difference between the voltages of said two pilot generators.

12. The combination with a transmission system comprising an alternating-current power circuit having a synchronous machine connected to each end thereof, a regulator disposed to control the excitation of one of said synchronous machines, said regulator having a solenoid element influenced by the voltage of that machine, an auxiliary winding magnetically associated with said solenoid element, an alternating-current pilot generator driven by each of said two synchronous machines, and a circuit for impressing upon said auxiliary winding the vector difference between the voltages of said two pilot generators, said auxiliary winding and its energizing generators being so disposed that changes in machine excitation which the regulator effects will proceed in substantial time-phase coincidence with the changes in system phase angle which occasion them.

13. The combination with a synchronous-synchronous transmission system comprising an alternating-current power circuit having a synchronous dynamo-electric machine connected therewith, a voltage regulator disposed to control the excitation of said machine, an auxiliary control element for the regulator, and means for supplying to said element a voltage which varies in accordance with deviations of the system phase angle from a given value, said means comprising an alternating-current pilot generator driven by said synchronous machine, and a circuit for impressing upon said auxiliary element the vector difference between the voltage of said pilot generator and the terminal voltage of the synchronous machine which drives it.

14. The combination with a transmission system comprising an alternating-current power circuit having a synchronous machine connected therewith, a regulator disposed to control the excitation of said machine, said regulator having a solenoid element, influenced by the terminal voltage of the machine, an auxiliary winding magnetically associated with said solenoid element, an alternating-current pilot generator driven by said synchronous machine, and a circuit for impressing upon said auxiliary winding the vector difference between the voltage of said pilot generator and the terminal voltages of the synchronous machine which drives it.

15. The combination with a transmission system comprising an alternating-current power circuit having a synchronous machine connected therewith, a regulator disposed to control the excitation of said machine, said regulator having a solenoid element, influenced by the terminal voltages of the machine, an auxiliary winding magnetically associated with said solenoid element, an alternating-current pilot generator driven by said synchronous machine, and a circuit for impressing upon said auxiliary winding the vector difference between the voltage of said pilot generator and the terminal voltage of the synchronous machine which drives it, said auxiliary winding and its energizing sources being so disposed that changes in machine excitation which the regulator effects will proceed in substantial time-phase coincidence with the changes in system phase angle which occasion them.

16. The combination with a transmission system comprising an alternating-current power circuit, a synchronous dynamo-electric machine having armature windings connected with said circuit and a field winding, a source of current for the field winding, a voltage regulator disposed to control said field winding current, an auxiliary control element for the regulator, and means for impressing upon said control element a control force which influences it in accordance with the rate of change of machine field winding current.

17. The combination with a transmission system comprising an alternating-current power circuit, a synchronous dynamo-electric machine having armature windings connected with said circuit and a field winding, a source of current for the field winding, a voltage regulator disposed to control said field winding current, said regulator comprising an element influenced by the voltage of said machine, an auxiliary element comprising a pair of windings disposed to exert opposing forces thereon, and means for supplying to said windings an energizing potential which varies in direct accordance with the magnitude of the machine field winding current, the time constant of the circuit of one of said windings being much faster than is that of the other winding.

18. The combination with a transmission system comprising an alternating-current power circuit, a synchronous dynamo-electric machine having armature windings connected with said circuit and a field winding, a source of current for the field winding, a voltage regulator disposed to control said field winding current, said regulator comprising an element influenced by the voltage of said machine, an auxiliary element comprising a pair of windings disposed to exert opposing forces thereon, and means for supplying to said windings an energizing potential which varies in direct accordance with the magnitude of the machine field winding current, the time constant of the circuit of one of said windings being much faster than is that of the other winding, said auxiliary element winding being so disposed that only rapid changes in the magnitude of machine field winding current are effective in causing the auxiliary element to modify the normal response characterstics of the regulator.

ROBERT D. EVANS.